United States Patent [19]

Harper, Jr.

[11] Patent Number: 4,536,422

[45] Date of Patent: Aug. 20, 1985

[54] PROCESS TO IMPART SMOOTH-DRY AND FLAME RETARDANT PROPERTIES TO CELLULOSIC FABRIC

[75] Inventor: Robert J. Harper, Jr., Metairie, La.

[73] Assignee: The United States of America as represented by the Secretary of Agriculture, Washington, D.C.

[21] Appl. No.: 586,617

[22] Filed: Mar. 6, 1984

[51] Int. Cl.$^3$ .................. B05D 3/02; D06M 13/34
[52] U.S. Cl. ........................................ 427/381; 8/181; 8/182; 427/387; 427/392; 427/393.3
[58] Field of Search .............. 8/181, 182; 427/381, 427/387, 392, 393.3

[56] References Cited

U.S. PATENT DOCUMENTS 3,771,957  11/1973  Vail ................................... 8/181 X
4,011,613   3/1977  Bertoniere et al. ............... 8/181 X Primary Examiner—Michael R. Lusignan
Attorney, Agent, or Firm—M. Howard Silverstein; David G. McConnell; Raymond C. Von Bodungen

[57] ABSTRACT

Fabric is padded with a solution of nitrogen rich N-methylol crosslinking agent, acid catalyst, antimony oxide and a halogen containing alcohol; dried at about 140°–190° F. and then cured at about 250°–400° F. for sufficient time to impart smooth-dry and flame retardant properties to said fabric. Aqueous polyethylene or silicone emulsion softeners can be added to the padding solution if desired. Glycol, polyol and dibromoneopentyl glycol make exemplary halogen containing alcohols. The process can also be varied to first pad with antimony oxide, dry, and then repad with a solution of: nitrogen rich N-methylol crosslinking agent, acid catalyst, and a halogen containing alcohol, dry again and cure, at the temperatures specified supra.

14 Claims, No Drawings

PROCESS TO IMPART SMOOTH-DRY AND FLAME RETARDANT PROPERTIES TO CELLULOSIC FABRIC

BACKGROUND OF THE INVENTION

1. Field of the Invention

This invention relates to processes for imparting smooth-dry and flame retardancy to cotton fabrics.

2. Description of the Prior Art

Cotton by itself does not possess either smooth-dry (DP) or flame retardance (FR) characteristics. In order for cotton to acquire these properties, cotton must be given a chemical finish. In the case of smooth dry performance, this is achieved by the crosslinking of cotton using one of the well-known crosslinking agents such as dimethylol dihydroxyethyleneurea.

In the case of flame retardancy, performance is achieved by applying finishes that add concentrations of compounds that contain elements which have been found to be effective in improving the fire resistance of cotton. Two systems are frequently employed. One system is based on finishes that add a combination of phosphorus and nitrogen to the fabric while the second utilizes a combination of antimony and halogen.

In the case of phosphous-nitrogen finishes, a well-known finish is the so-called THPOH—NH₃ [tetrakis(-hydroxy methyl)phosphonium hydroxide-ammonia] finish. In this case, the THPOH is padded onto the fabric, the fabric is dried and the fabric is treated with gaseous ammonia. Subsequently, the fabric is oxidized. Attempts to give this fabric a durable-press finish by application of a crosslinking agent are generally unsuccessful because the crosslinking agent is reactive with the free —N—H groups in the THPOH—NH₃ polymer rather than the OH groups of cellulose. Similarly, pretreatment of the fabric with crosslinking agent prior to FR finishing, generally renders the FR treatment ineffective.

The other systems utilized to make cotton fabrics flame retardant are based upon the use of compounds containing antimony and halogen. Typically, the antimony is added to the fabric in the form of antimony oxide. The halogenated component is added either in the form of halogenated polymers or as in small discrete inert halogenated compounds such as decabromo diphenyl oxide. Both the antimony and small discrete halogenated compounds are retained on the fabric by means of being trapped in the fabric by the use of added polymers in the finish. Polyacrylates are frequently used for this purpose. The high add-ons of polymers in this finish tends to lead to a stiff fabric.

SUMMARY OF THE INVENTION

A process for imparting smooth-dry and flame retardant properties to cellulosic fabrics is disclosed. A cellulosic fabric is padded with a solution of nitrogen rich N-methylol crosslinking agent, an acid catalyst, a halogen containing alcohol and antimony oxide. The fabric is then dried until all of the moisture is driven off and cured at sufficient time and temperature to impart smooth-dry flame retardant properties to the fabric.

The process can be modified to first pad the cellulosic fabric with a solution of antimony oxide, dry the fabric, and then repad with a solution of: nitrogen rich N-methylol crosslinking agent, an acid catalyst, and a halogen containing alcohol, dry again, and cure at sufficient time and temperature to impart smooth-dry flame retardant properties to the fabric.

DESCRIPTION OF THE PREFERRED EMBODIMENTS

In order to produce flame retardant cotton fabrics with smooth dry properties, a finish was invented which contains crosslinking agents or combination of crosslinking agents, a halogenated alcohol or polyol which is co-reactive with crosslinking agents, antimony oxide and auxiliaries such as softeners, catalysts or solvents. The role of these crosslinking agents is fourfold. First, the crosslinking agent reacts with cotton to impart required resiliency. Second, it functions as a binding agent to help in the retention of antimony oxide used in the finish. Third, it reacts chemically with the halogenated alcohol used in this finish to tie said alcohol into the cotton substrate and finally it imparts nitrogen to the fabric thus increasing overall flame resistance.

From a chemical point of view, the unique characteristic of this finish is the interaction between the cellulose fiber, crosslinking agent and halogenated alcohol to produce a chemical matrix in which all three components are chemically bound together. In this finish it is advantageous to use agents such as dimethylol dihydroxyethyleneurea (DMDHEU), trimethylol melamine (TMM) or trimethylol acetylenediureine (MACD) because they possess several reactive sites. The methylolmelamines and methylolacetylenediureine (MACD) possess added nitrogen content. Representation structures of these agents are as listed.

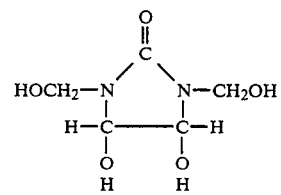

DMDHEU

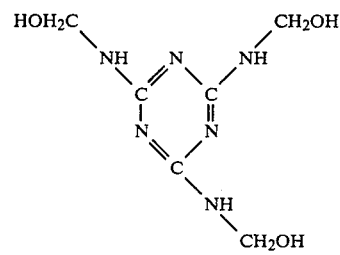

TMM

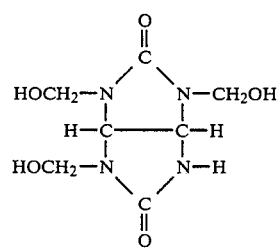

MACD

The second major component in this finish is the halogenated alcohol. The specific compound selected for this purpose was dibromoneopentyl glycol (DBG). This material contains two bromine atoms and two reactive alcohol sites and only five carbon atoms. As such, it contains 61% bromine.

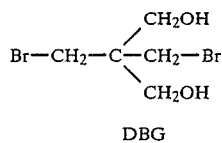

DBG

The reaction between cotton, crosslinking agent, and alcohol (ROH) can be represented in the following manner recognizing that a given crosslinking reaction can occur at any two of the reactive sites.

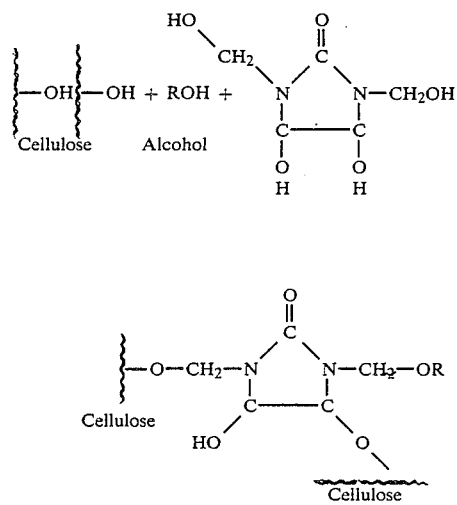

The third major component in the finish is antimony oxide. Its retention on fabric is achieved primarily by means of the trapping and polymer forming action of the crosslinking agent. Also included in some of the finishes were softeners such as polyethylene or silicone, but these materials did not appear to make a significant difference in overall antimony retention after one or 25 launderings, although polyethylene should be beneficial for this purpose.

Some comments should be made as to the mode of effectiveness of this finish. First, to be a useful FR - DP finish, the chemical agents used to produce desired properties must be retained through a number of launderings. In this patent, the properties after 25 launderings are reported because this demonstrates performance after what would be extended usage. Properties focused on are retention of elements that impart flame retardancy such as halogen, antimony and nitrogen contents, tests designed to show flame retardancy such as oxygen index (OI) or standard vertical flame test and measurement of smooth dry performance such as DP rating.

In the case of oxygen index (OI), untreated cotton fabrics have an OI of 0.18. Flame retardant treatments increase the oxygen index and it is generally recognized OI of 0.25 or higher is required if a fabric is to pass a standard vertical flame test. This latter test is a test used to measure whether or not a fabric is flame retardant. While an untreated cotton will be consumed entirely once ignited, a FR fabric must self-extinguish with a char length of not more than five inches if it is to be deemed flame retardant. In the case of DP ratings, untreated cottons have DP ratings of 1.0 usually and increasing smooth dry ratings up to 5.0 reflect increasing fabric smoothness. While most commercial fabrics with only DP finishes approach a rating of 4.0, with a combination finish which would have a heavy chemical loading, a rating of 3.0 or higher would be deemed commercially acceptable.

In this invention, it is necessary to apply a chemical finish to a cotton substrate (fabric), dry and cure said fabric and wash to remove unreacted reagents.

In the examples given in this application, both one step and two step treatments are reported. The two step treatments were developed because with certain combinations of reagents, particularly in cases in which high levels of antimony oxide were employed, bath instability arose because of interaction of reagents. In these cases the particular sequence employed with this invention was to pad the fabric first with an aqueous dispersion containing antimony oxide and a softener (optional ingredient in treatment, examples of softeners were polyethylene and silicones). Subsequent to padding, the fabric was padded with a solution containing crosslinking agent or agents, catalyst and the dibromoneopentylglycol. Because the glycol is only soluble in water to a limited extent, it was necessary to use a solvent system containing equal amounts of ethanol-water. Other solvent systems could likewise be used as long as said systems would dissolve required chemical reagents.

While this particular invention was found to be most effective with the dibromoneopentyl glycol, other halogen-containing alcohols could likewise be used in this system.

The major advantages of this process over others based on halogen and antimony are twofold. First, no large quantity of surface polymers are required because all agents are non-polymeric compounds, which should have good penetration into cotton. As such, this finish should avoid long term stiffness associated with many antimony-halogen finishes. Second, the halogenated compound being bound via a covalent chemical bond to the cotton substrate should possess better retention characteristics than that exhibited by distinct halogen compounds which are merely adsorbed or trapped on the cotton surface.

The utility of this invention is described in the following examples.

EXAMPLE 1

A pad bath (bath A) was prepared that contained 10% antimony oxide (colloidal), 0.1% wetting agent (ethoxylated alcohol) and the remainder water. Cotton fabrics, one a swiss pique knit and the other a 3/2 twill, were padded (2 dips and 2 nips) with this formulation and then the fabrics were dried for 7 minutes at 140° F. A second formulation (bath D) was prepared that contained 10% trimethylol melamine, 7% dimethylol dihydroxyethyleneurea, 20% dibromoneopentyl glycol, 0.8% zinc nitrate hexahydrate and 0.1% wetting agent (ethoxylated alcohol) dissolved in equal portions of alcohol-water. The fabrics from the first step (antimony oxide treatment) were then padded in this formulation, dried for 7 minutes at 140° F., and cured for 4 minutes at 320° F. These fabrics were then laundered for 25 times and tested for various properties, the results of which are given in Table 1. It can be seen that fabrics possess acceptable smooth dry and fire retardant ratings.

TABLE I

PROPERTIES OF FABRICS FINISHED WITH SMOOTH DRY AND FLAME RETARDANT FINISH
← AFTER 25 LAUNDERINGS →

| Example | Fabric | DP Rating | Vert. Flame Test Char Length In. | OI | % Br | % Sb | % N |
|---|---|---|---|---|---|---|---|
| 1 | Swiss Pique | 3.8 | 4.63 | 0.288 | 3.23 | 1.40 | 4.37 |
| 1 | Twill | 3.5 | 4.19 | 0.272 | 2.41 | 1.45 | 4.19 |
| 2 | Swiss Pique | 3.3 | 2.93 | 0.306 | 3.39 | 1.34 | 3.55 |
| 2 | Twill | 3.4 | 2.77 | 0.281 | 1.98 | 1.64 | 3.88 |
| 3 | Swiss Pique | 3.7 | 2.97 | 0.289 | 3.19 | 2.03 | 3.95 |
| 3 | Twill | 3.6 | 2.97 | 0.264 | 1.60 | 1.91 | 3.97 |
| 4 | Swiss Pique | 3.8 | 2.80 | 0.270 | 3.04 | 1.42 | 3.23 |
| 4 | Twill | 3.7 | 3.27 | 0.253 | 1.70 | 2.20 | 3.24 |
| 5 | Swiss Pique | 3.6 | 3.07 | 0.279 | 2.59 | 1.49 | 3.57 |
| 5 | Twill | 3.8 | 3.23 | 0.257 | 1.22 | 1.51 | 3.14 |
| 6 | Swiss Pique | 3.7 | 3.33 | 0.265 | 2.25 | 1.47 | 3.49 |
| 6 | Twill | 3.8 | 3.40 | 0.250 | 1.54 | 2.21 | 2.93 |

EXAMPLE 2

A pad bath (bath B) was prepared that contained 10% antimony oxide (colloidal), 0.5% polyethylene softener, and 0.1% wetting agent (ethoxylated alcohol) and the remainder water. The aqueous polyethylene emulsion softener used in this formulation was Velvetol OE, produced by Quaker Chemical, Conshohocken, Pa. Cotton fabrics, one a swiss pique knit, and the other a 3/2 woven twill, were then padded with this formulation and the fabrics were dried for 7 minutes at 140° F. Then the fabrics were padded with bath D as in Example 1, then dried, cured and laundered 25 times as in Example 1. Tests for various properties of these fabrics are given in Table I. There, results show that FR-DP fabrics durable to repeated laundering can be prepared by this process.

EXAMPLE 3

A pad bath (bath C) was prepared that contained 10% antimony oxide (colloidal), 1.0% silicone softener, 0.1% wetting agent (ethoxylated alcohol) and the remainder water. The aqueous based silicone softener used in this formulation was Dow Corning 1111, produced by Dow Corning Corp., Midland, Mich. Cotton fabrics, one a swiss pique knit and the other a 3/2 woven twill were padded with this formulation and then the fabrics were dried for 7 minutes at 140° F. Then the fabrics were padded with bath D as in Example 1, dried, cured, and laundered 25 times as in Example 1. Tests for the various properties of these fabrics are given in Table I. These results show that FR-DP fabrics durable to laundering can be prepared by this process.

EXAMPLE 4

Cotton fabrics, one a swiss pique knit and the other a 3/2 woven twill were padded with pad bath A (from Example 1). The fabrics were then dried for 7 minutes at 140° F. A second formulation (bath E) was prepared that contained 8% trimethylol melamine, 7% dimethylol dihydroxyethyleneurea, 20% dibromoneopentyl glycol, 0.7% zinc nitrate hexahydrate, and 0.1% wetting agent (ethoxylated alcohol) dissolved in solvent prepared from equal quantities of ethanol and water.

The fabrics from the first step (antimony oxide treatment) were then padded with pad bath E, dried for 7 minutes at 140° F., and cured for 4 minutes at 320° F. These fabrics were then laundered 25 times and tested for various properties. The results, as given in Table I, show that these fabrics possess acceptable smooth dry and flame retardant characteristics after 25 launderings.

EXAMPLE 5

Cotton fabrics, one a swiss pique knit and the other a 3/2 woven twill, were padded with pad bath B (as in Example 2). The fabrics were then dried for 7 minutes at 140° F. Then the fabrics were padded with pad bath E as in Example 4, then dried, cured, and laundered as in Example 4. Tests for the various properties of these fabrics are given in Table I. The results show that FR-DR fabrics durable to laundering can be prepared by this process.

EXAMPLE 6

Cotton fabrics, one a swiss pique knit and the other a 3/2 woven twill were padded with bath C as in Example 3. These fabrics were then dried for 7 minutes at 140° F. Then, the fabrics were padded with bath E as in Example 4, and then dried, cured, and laundered 25 times as in Example 4. Tests for various properties of these fabrics are given in Table I. These results show that this process produces fabrics with acceptable smooth dry and flame retardant characteristics after 25 launderings.

EXAMPLE 7

Two samples of swiss pique knit fabric were processed using pad baths A and D as in Example 1. They were then dried and cured as in Example 1. The fabric was then laundered one time. At this point they had DP ratings of 3.5 and 3.4 respectively and an oxygen index value of 0.315. This shows the effectiveness of this treatment after one laundering in terms of smooth dry and flame retardant performance.

EXAMPLE 8

A sample of a swiss pique knit fabric was processed using pad baths B and D as in Example 2. The fabric was also dried and cured as in Example 2. The fabric was then laundered one time. At this point the fabric had a DP rating of 3.6 and an oxygen index of 0.331. This demonstrates the effectiveness of this treatment after one laundering in terms of smooth dry and flame retardant performance.

EXAMPLE 9

A sample of a swiss pique knit was processed using pad baths C and D as in Example 3. The fabric was also dried and cured as in Example 3. The fabric was then laundered one time. At this point the fabric had a DP rating of 3.4 and an oxygen index of 0.318. This demonstrates the effectiveness of this treatment after one laundering in terms of smooth dry and flame retardant performance.

EXAMPLE 10

A pad bath (bath F) was prepared that contained 5% antimony oxide (colloidal), 0.1 wetting agent (ethoxylated alcohol) and the remainder water. Cotton fabrics, one a swiss pique knit and the other an interlock knit, were padded with this formulation. Then, the fabrics were dried for 7 minutes at 140° F. Then they were padded with bath D as in Example 1. They were then dried and cured as in Example 1 and laundered a single time. The swiss pique had a DP rating of 3.6 and an oxygen index of 0.306. The interlock knit had a DP rating of 3.7 and an oxygen index of 0.293. These results demonstrate the effectiveness of this treatment after one laundering in terms of imparting smooth dry and flame retardant performance.

EXAMPLE 11

A pad bath (bath G) was prepared that contained 7% trimethylol melamine, 7% methylol acetylenediurene, 5% antimony oxide (colloidal), 0.6% zinc nitrate hexahydrate, 20% dibromoneopentyl glycol, 0.1% wetting agent (ethoxylated alcohol) dissolved in equal parts of ethanol and water. Two samples each of two cotton fabrics (one a 1/1 rib knit and the other a cotton sateen) were padded with this formulation, dried for 5 minutes at 175° F. and cured for 4 minutes at 320° F. The fabrics were then laundered one time. The 1/1 rib knit had a DP rating of 3.6 and an average OI of 0.360. The sateen fabric had DP ratings of 2.9 and oxygen indexes of 0.268. These results demonstrate the effectiveness of this treatment in imparting smooth dry and flame retardant performance.

I claim:

1. A process for imparting smooth-dry and flame retardant properties to cellulosic fabrics comprising:
    (a) padding a cellulosic fabric with a solution comprising sufficient amounts of: N-methylol crosslinking agent, an acid catalyst, a halogen containing alcohol, and antimony oxide to produce smooth-dry flame retardant properties in the fabric;
    (b) drying said cellulosic fabric for sufficient time and at sufficient temperature to drive off the moisture; and then,
    (c) curing said cellulosic fabric for sufficient time and temperature to impart smooth-dry flame retardant properties to said fabric.
2. The process of claim 1 wherein the cellulosic fabrics are cotton.
3. The process of claim 1 wherein the padding solution of step (a) includes an aqueous polyethylene emulsion or an aqueous silicone emulsion softener.
4. The process of claim 1 wherein the padding solution contains from about 5 to 20% nitrogen rich N-methylol crosslinking agent; 0.15 to 4% of acid catalyst; 3 to 15% of antimony oxide, and 5 to 25% of a halogen containing alcohol.
5. The process of claim 1 wherein the halogen containing alcohol is glycol or polyol.
6. The process of claim 1 wherein the halogen containing alcohol is dibromoneopentyl glycol.
7. The process of claim 1 wherein the drying temperature is from about 140° to 190° F. and the curing temperature is from about 250° to 400° F.
8. A process for imparting smooth-dry and flame retardant properties to cellulosic fabrics comprising:
    (a) padding a cellulosic fabric with a solution of from about 3% to 15% antimony oxide;
    (b) drying said fabric for sufficient time and at sufficient temperature to drive off the moisture;
    (c) repadding said fabric with a solution comprising sufficient amounts of: N-methylol crosslinking agent, an acid catalyst, and a halogen containing alcohol to produce smooth-dryflame retardant properties in the fabric;
    (d) drying said fabric for sufficient time and temperature to drive off the moisture; and then,
    (e) curing said cellulosic fabric for sufficient time and temperature to impart smooth-dry flame retardant properties to said fabric.
9. The process of claim 8 wherein the padding solution in step (a) includes an aqueous polyethylene emulsion or an aqueous silicone emulsion softener.
10. The process of claim 8 wherein the cellulosic fabric is cotton.
11. The process of claim 8 wherein the drying temperature is from about 140° to 190° F. and the curing temperature is from about 250° to 400° F.
12. The process of claim 8 wherein the repadding solution of step (c) contains from about 5 to 20% nitrogen rich N-methylol crosslinking agent; 0.15 to 4% of acid catalyst; 5 to 25% of a halogen containing alcohol.
13. The process of claim 8 wherein the halogen containing alcohol is glycol or polyol.
14. The process of claim 8 wherein the halogen containing alcohol is dibromoneopentyl glycol.

* * * * *